(12) United States Patent
Williams

(10) Patent No.: US 12,488,781 B1
(45) Date of Patent: Dec. 2, 2025

(54) PERSONAL TRANSLATOR DEVICE

(71) Applicant: Brandon E. Williams, Hawaiian Gardens, CA (US)

(72) Inventor: Brandon E. Williams, Hawaiian Gardens, CA (US)

( * ) Notice: Subject to any disclaimer, the term of this patent is extended or adjusted under 35 U.S.C. 154(b) by 261 days.

(21) Appl. No.: 17/955,580

(22) Filed: Sep. 29, 2022

(51) Int. Cl.
*G06F 40/47* (2020.01)
*G06F 3/0354* (2013.01)
*G06V 30/142* (2022.01)
*G10L 13/08* (2013.01)

(52) U.S. Cl.
CPC ........ *G10L 13/086* (2013.01); *G06F 3/03545* (2013.01); *G06F 40/47* (2020.01); *G06V 30/1423* (2022.01)

(58) Field of Classification Search
CPC ..... G06F 3/03545; G06F 40/47; G10L 13/086
USPC .......................................... 704/2, 5, 8, 251
See application file for complete search history.

(56) References Cited

U.S. PATENT DOCUMENTS

| | | | |
|---|---|---|---|
| 4,882,681 A | 11/1989 | Brotz | |
| 8,566,077 B2 | 10/2013 | Ander et al. | |
| 9,535,906 B2 | 1/2017 | Lee et al. | |
| 9,864,745 B2 | 1/2018 | Dalce | |
| 10,108,612 B2 | 10/2018 | Lee et al. | |
| 10,528,677 B1 | 1/2020 | Zhang et al. | |
| 10,553,215 B2 | 2/2020 | Saddler et al. | |
| 10,628,531 B2 | 4/2020 | Duc et al. | |
| 2009/0048820 A1 | 2/2009 | Buccella | |
| 2013/0201162 A1* | 8/2013 | Cavilia | G06F 3/03545 345/179 |
| 2019/0182402 A1* | 6/2019 | Shriesher | H04N 1/1075 |
| 2022/0335228 A1* | 10/2022 | Liu | G06F 40/58 |

* cited by examiner

*Primary Examiner* — George C Monikang
(74) *Attorney, Agent, or Firm* — Cramer Patent & Design, PLLC.; Aaron R. Cramer

(57) ABSTRACT

A personal translator device comprises a pen configured to provide instantaneous language translation from all approximately 6,500 spoken and written languages into an audible form. The device is configured to operate without an internet connection and is capable of providing real-time, instantaneous translation. The pen also comprises a microphone capable of receiving a user's speech thereby converting the speech to a chosen language. The converted speech is communicated via a speaker worn by the user. The pen also comprises a written language scanner which translates the scanned language and communicates the same to the speaker.

1 Claim, 4 Drawing Sheets

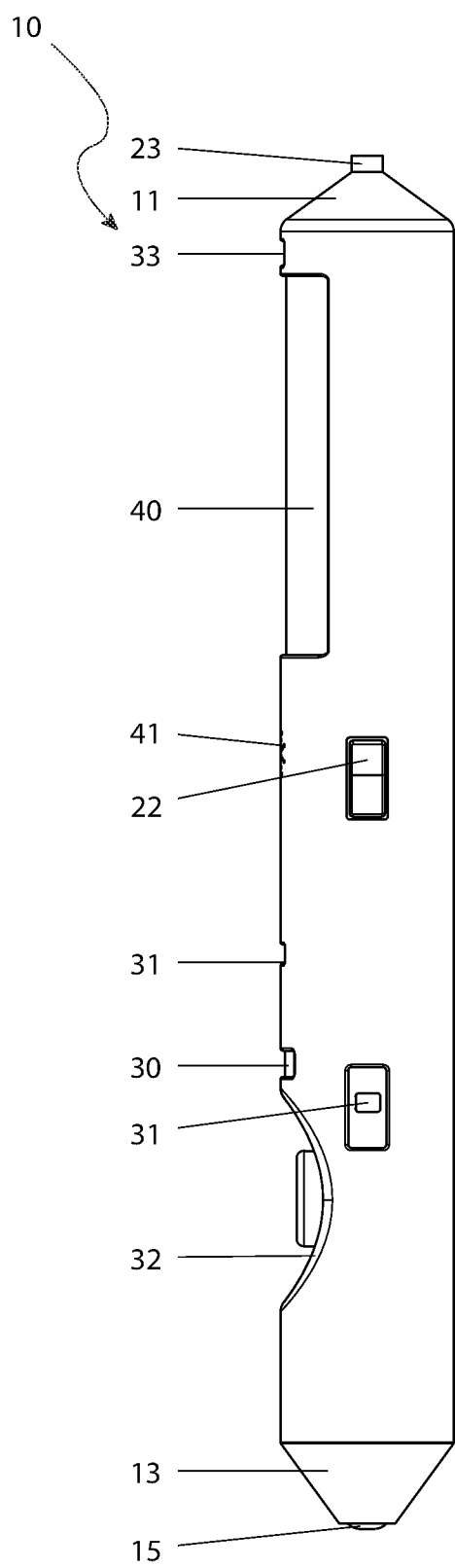
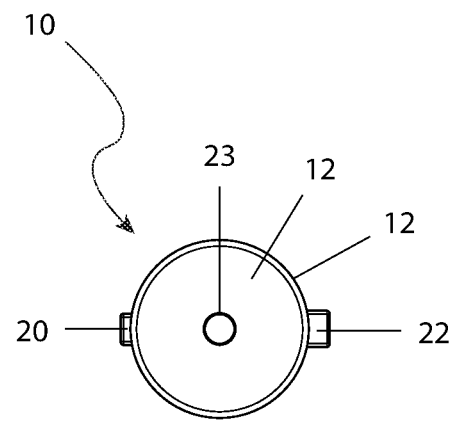
FIG. 5
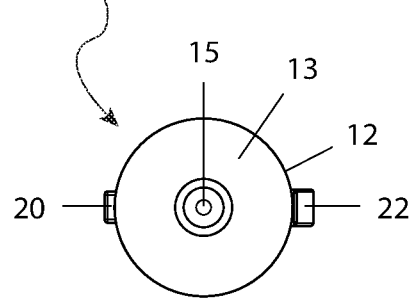
FIG. 6
FIG. 4

PERSONAL TRANSLATOR DEVICE

RELATED APPLICATIONS

None.

FIELD OF THE INVENTION

The present invention relates generally to a handheld language translation device.

BACKGROUND OF THE INVENTION

The development of electronics and computer technology has revolutionized virtually aspect of our lives. Appropriately deemed the information age, this technology allows anyone with access to a computer to communicate with and tap the knowledge of individuals and organizations throughout the world. Running hand-in-hand with this surge in information technology is the need to communicate with people all over the world as well. As such, language barriers quickly arise as most people from different parts of the world speak different languages.

While electronic translators are available to help in this regard, they typically require a connection to the Internet for processing power which limit their usage area and do not provide true "real-time" translation. Additionally, while such devices can translate written text, they are relatively large handheld devices. Finally, such devices can only translate a small fraction of the world's 6,500 languages. Accordingly, there exists a need for a means by which real time translation of all 6,500 spoken and written languages can be performed almost anywhere using a small discrete device. The development of personal translator device fulfills this need.

SUMMARY OF THE INVENTION

The principles of the present invention provide for x

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a right side elevation view of the hand-held implement, according to the preferred embodiment of the present invention;

FIG. 5 is a top plan view of the hand-held implement, according to the preferred embodiment of the present invention;

FIG. 6 is a bottom plan view of the hand-held implement, according to the preferred embodiment of the present invention;

DESCRIPTIVE KEY

Figures 1, 2, 3:
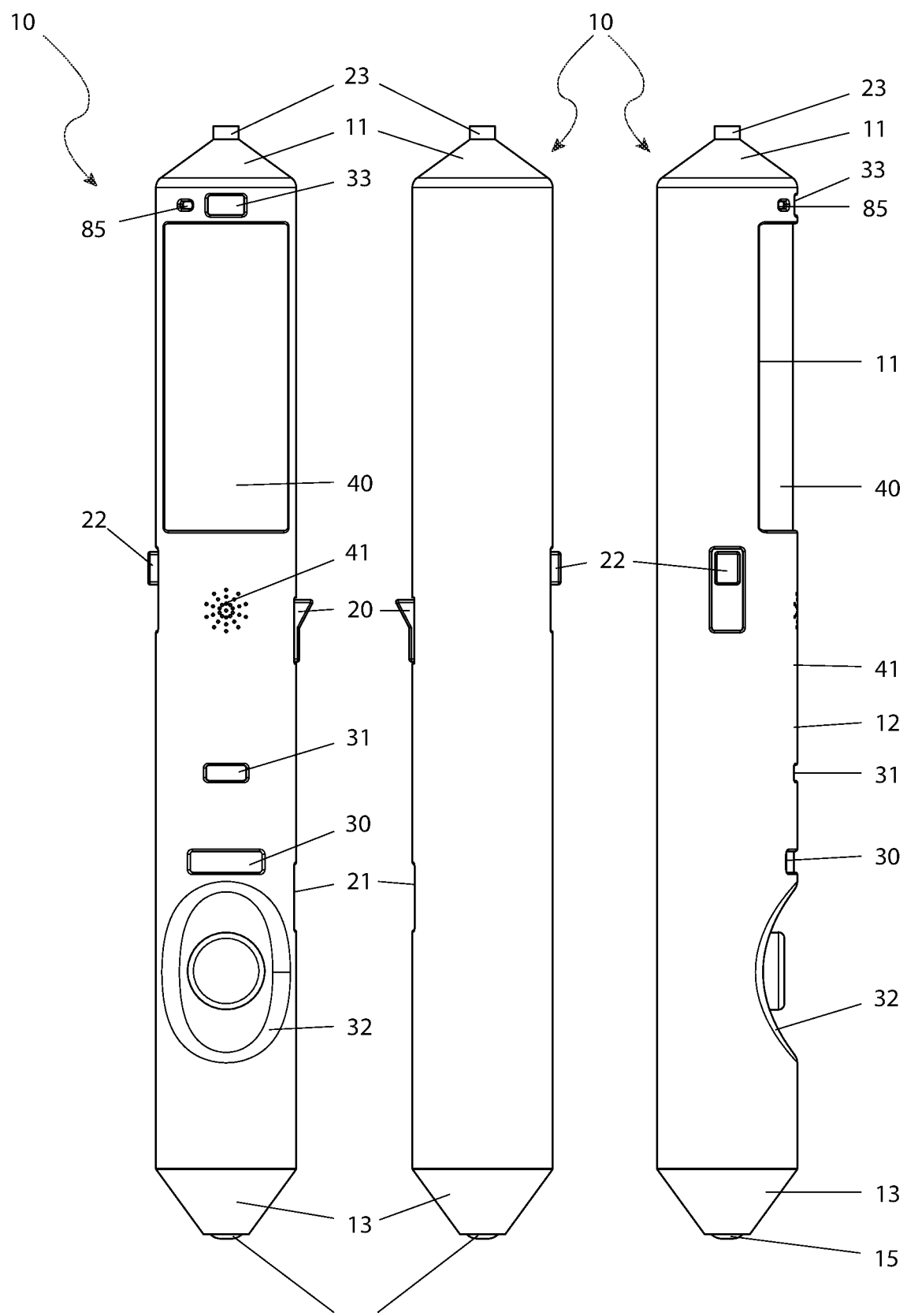
FIG. 1 is a front elevation view of a hand-held implement, according to the preferred embodiment of the present invention.
FIG. 2 is a rear elevation view of the hand-held implement, according to the preferred embodiment of the present invention.
FIG. 3 is a left side elevation view of the hand-held implement, according to the preferred embodiment of the present invention.

10 implement
11 upper body section
12 middle body section
13 lower body section
15 lens
20 power switch
21 charger port
22 volume control
30 selector control
31 selector switch
32 operating button
33 microphone switch
40 display
41 speaker grille
50 user
55 text
60 book
65 audio
70 camera
75 power source
80 main microprocessor
85 microphone
90 speaker
95 charge controller
100 display driver circuit
105 amplifier
110 memory circuits

1. DESCRIPTION OF THE INVENTION

Figure 7:
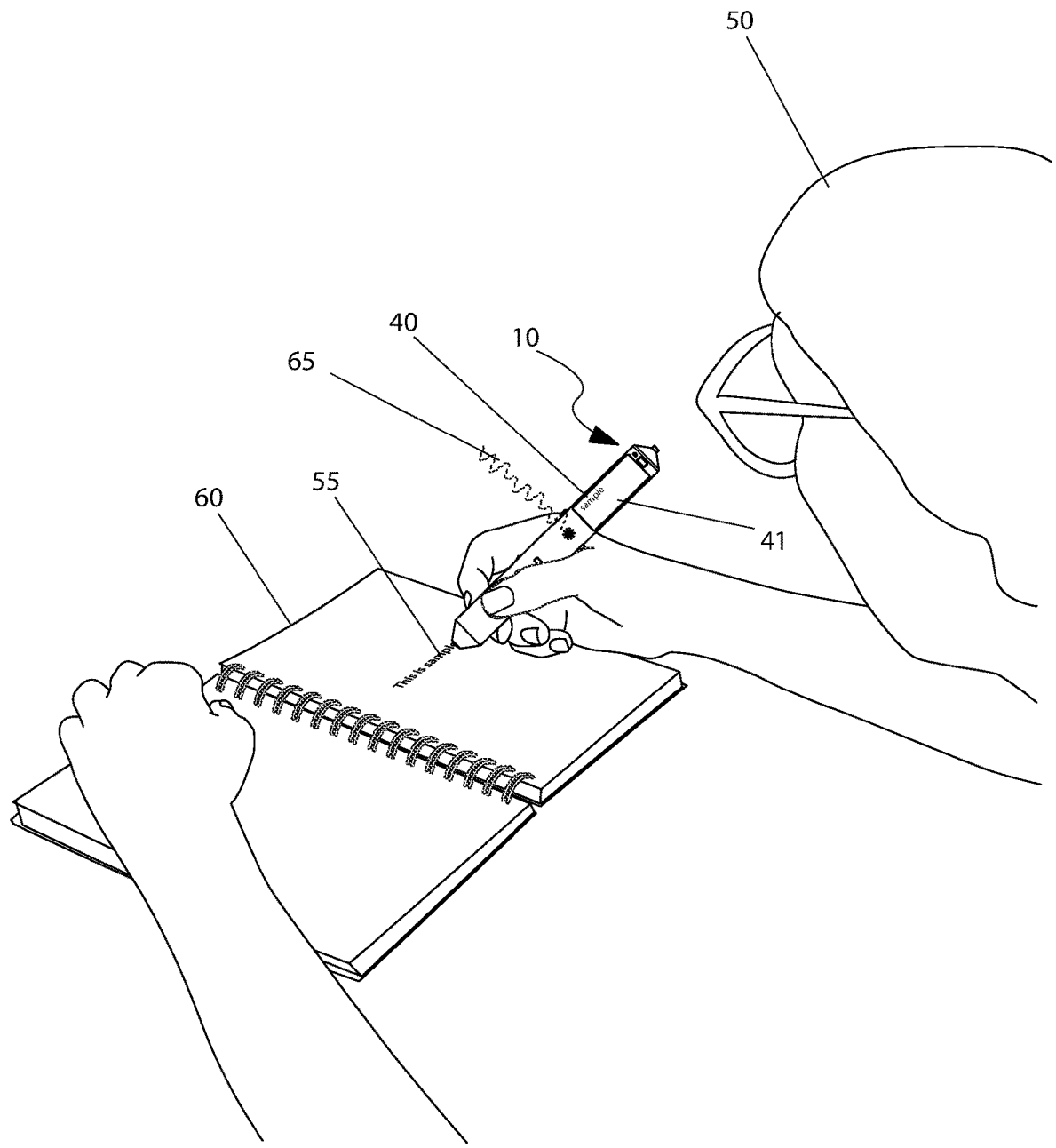
FIG. 7 is an environmental view of a user using the hand-held implement to translate text in a book.
Figure 8:
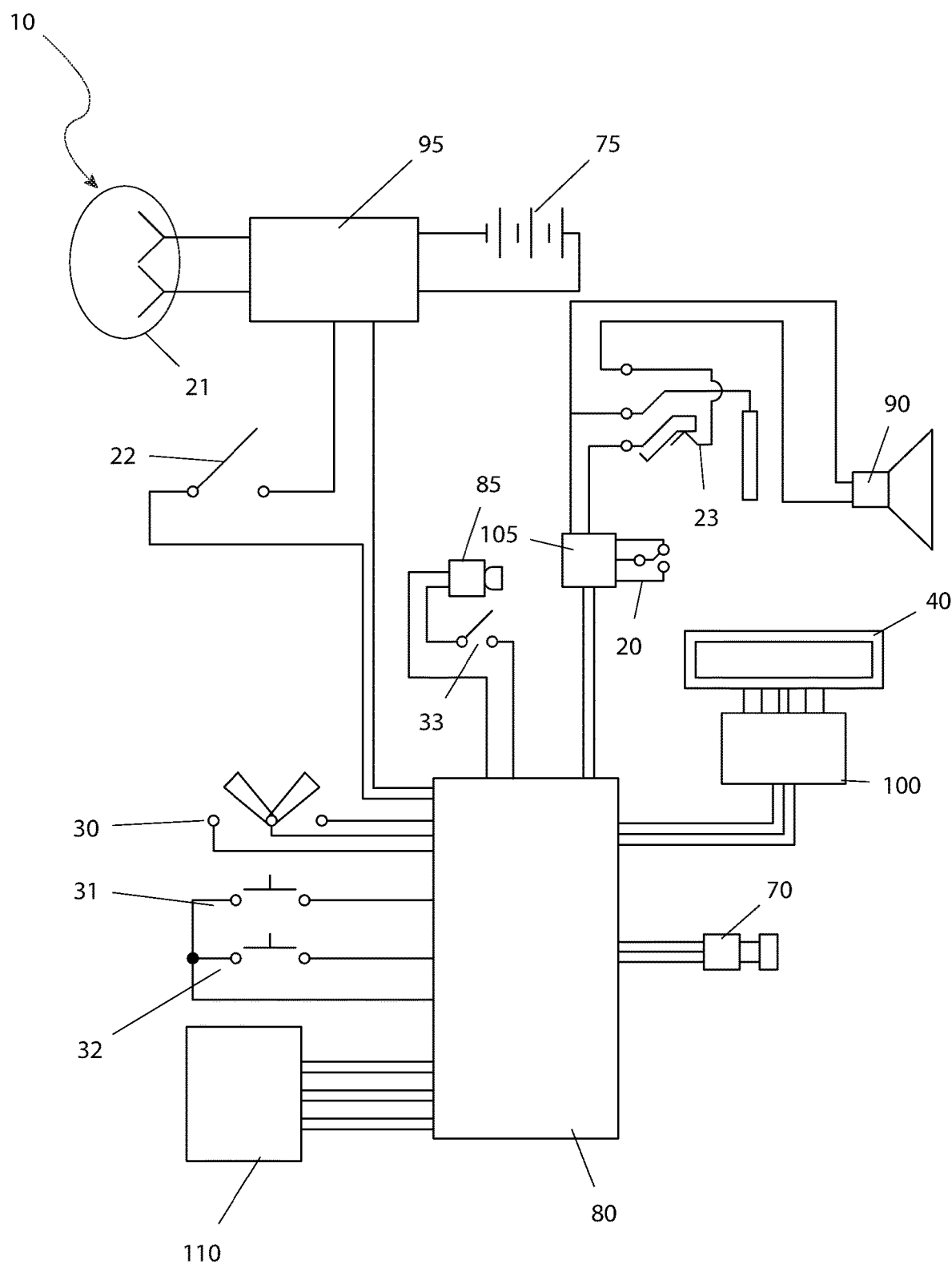
FIG. 8 is an electrical block diagram of the hand-held implement, according to the preferred embodiment of the present invention.

The best mode for carrying out the invention is presented in terms of its preferred embodiment, herein depicted within FIGS. 1 through 6, an illustrated exemplary method of use herein depicted in FIG. 7, and an electrical block diagram of FIG. 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

All of the implementations described below are exemplary implementations provided to enable persons skilled in the art to make or use the embodiments of the disclosure and are not intended to limit the scope of the disclosure, which is defined by the claims. The terms "a" and "an" herein do not denote a limitation of quantity, but rather denote the presence of at least one (1) of the referenced items.

Referring now to FIGS. 1 through 6, the invention is a hand-held implement 10 that is capable of translating text 55 in a first language as it traverses over the text 55 as directed by a user 50 to a second language. The implement 10 is capable of selectively displaying the second language either digitally on a display 40 on the implement 10 or emitted as an audio signal 65 through a speaker on the implement 10.

The implement 10 is generally in the shape of a writing implement, such as an oversized pen or pencil, or like an electronic stylus, having a generally large outer diameter of up to about an inch (1 in.) and a length of approximately five inches (5 in.). The implement 10 is preferably manufactured out of a resilient and inert plastic or other similar synthetic material, having a hollow interior that houses electronic components, such as a power source 75 and a microprocessor 80. The implement 10 generally comprises an upper body section 11, a middle body section 12, and a lower body section 13.

As best seen in FIG. 1 and FIG. 5, the upper body section 11 is shaped as a truncated cone and extends linearly outward from the upper end of the middle body section 12. As best seen in FIG. 1 and FIG. 6, the lower body section 13 is also shaped as a truncated cone and extends linearly outward from the lower end of the middle body section 12 and terminates in a lens 15. A camera 70 is located within the lower body section 13 and in electrical communication with the power source 75 and microprocessor 80 and aligned with the lens 15.

The middle body section 12 is generally a cylindrical shape and is the portion of the implement 10 that the user 50 can grip when manipulating the implement 10. Located within the middle body section 12 is the power source 75, preferably embodied as a rechargeable battery, that provides power to all the electronic components and the microprocessor 80 in electrical communication therewith. The microprocessor 80 provides logic control to the various electronic components of the implement 10. As best seen in FIG. 4, located on the surface of the middle body section 12 is a power switch 20 in electrical communication with the power source 75. In the exemplary embodiment, the power switch 20 is a slidably activating switch or in other embodiments can be a rocker-type switch. A display 40 is located adjacent the upper body section 11 and also is in electrical communication with the power source 75 and the microprocessor 80. The display 40 is digital and large enough for the user 50 to easily view.

A microphone 85 is located adjacent the upper body section 11, preferably between the display 40 and the upper body section 11. A microphone switch 33 is in electrical communication with the microprocessor 80 and a microphone 85 (please see FIG. 8). The microphone 85 is capable of receiving audio sounds and transmitting them to the microprocessor 80 for further processing. A speaker grille 40 is located on the middle body section 12 adjacent to the display 40 and on the opposite side thereof from the microphone 85. A speaker 90 is in indirect electrical communication with the microprocessor 80 and emits resultant audio signals 65 from the speaker grill 41. As best seen in FIG. 3, a volume control 22 is located on the middle body section 12, preferably diametrically opposite the power switch 20 and in electrical communication with the speaker and also perhaps the microphone 85. The volume control 22 can either be a sliding switch or a rocker-type switch to cycle between "soft" and "loud" pre-set volumes.

As best seen in FIG. 1, a selector control 30 is located at an intermediary position on the middle body section 12. In an exemplary embodiment, the selector control 30 is a thumb wheel, an incremental pushbutton, or other similar structure to enable the user 50 to scroll through pre-selected menu items stored on the microprocessor 80. Immediately adjacent the selector control 30 is a selector switch 31, preferably comprising a push-button or similar structure. An operating button 32 is also located adjacent the selector control 30, preferably on the opposite side thereof than the selector switch 31. The operating button 32 is larger and shaped similar to an oval and includes a depression on the face of the implement 10 is capable of receiving a thumb or other digit of a user 50 to continuously activate the desired operation of what menu item is selected. The selector control 30, selector switch 31, and operating button 32 are each in electrical communication with the power source 75 and the microprocessor 80. The selector control 30, selector switch 31, and operating button 32 are linearly aligned with the display 40, such that when the user 50 operates the selector control 30 and selector switch 31, the user can easily view the menu items on the display 40 and the desired selected menu item. Such menu items may include but are not limited to: options to activate the microphone switch 33 and hence the microphone 85, options to activate the amplifier 105 and hence the speaker 90, options to selectively translate a chosen list of languages for translating a first language, and options to selectively a chosen list of languages for transmitting the second language, among others.

In an exemplary method of use, as illustrated in FIG. 7, a user 50 grasps the implement 10 and approaches material of an item to be translated from a first language to a second language, such as text 55 in a first language in a book 60. The user 50 activates the implement 10 by use of the power switch 20. The user 50 then scrolls through the first language pre-set menu items by use of the selector control 30. The first language pre-set menu items are displayed on the display 40. Upon reaching the desired first language pre-set menu item, as indicated on the display 40 as a highlighted or otherwise clear choice, the user 50 activates the selector switch 31. The user 50 then scrolls through the second language pre-set menu items by use of the selector control 30. The second language pre-set menu items are displayed on the display 40. Upon reaching the desired second language pre-set menu item, as indicated on the display 40 as a highlighted or otherwise clear selectable choice, the user 50 activates the selector switch 31. The user 50 then scrolls through the translating means pre-set menu items by use of the selector control 30. The translating means pre-set menu items are displayed on the display 40. Upon reaching the desired translating means pre-set menu item, as indicated on the display 40 as a highlighted or otherwise clear choice, the user 50 activates the selector switch 31. The user 50 then directs the lens 15 over the text 55, preferably in a consistent manner to enable the camera 70 to pick up the text 55 and transmit it to the microprocessor 80 for further processing as selected by the user 50. In order to do that, the user 50 must continuously activate the operating button 32 during the scrolling phase over the text 55. The camera 70 transits an image of the text 55 to the microprocessor concurrent with activation of the operating button 32. The user 50 then receives communication of the translation of the first language to the second language by way of the translating means.

By way of description for a more specific method of use, if the first language of the text 55 in the book 60 is in Korean and the user 50 wishes to translate that into a second language that is English, then the selecting "Korean" in the first language pre-set menu and then selecting "English" in the second language pre-set menu will translate the Korean text 55 to English text that is then displayed on the display 40. If the user 50 then wishes to receive the English text via audio signals 65 from the transmitter 23, the user 50 pairs a desired electronic device to wirelessly communicate with the transmitter 23. The user 50 passes the lens 15 over the text 55 while simultaneously activating the operating button 32. This enables the device 10 to translate the Korean text 55 to an English audio signal 65 delivered to the user 50 via the transmitter 23 or the speaker 90. The volume control 22 controls the desired output volume.

An alternate method of use can provide for another pre-set menu item to indicate the period of time the camera 70 transmits the image of the text 55 upon a single, instead of continual, activation of the operating button 32, to relieve the stress of constant activation on the part of the user 50.

Another alternate method of use is to enable the user 50 to speak the first language into the microphone 85 while simultaneously, or a pre-set period of time as selected in yet another pre-set menu item, activating the microphone switch 33. The second language as selected by the chosen second language pre-set menu item can then be communicated to the user 50 via a chosen translating means pre-set menu item.

Referring now more closely to FIG. 8, the electrical circuitry of the implement 10 receives incoming power via the charger port 21 (please see FIG. 3). The power is then delivered to a charge controller 95. The charge controller 95 then ensures the power source 75 is maintained at a proper level and not overcharged. Resultant power is then provided to the power switch 20, and in the ON position delivers electrical power to the microprocessor 80. The microprocessor 80 receives inputs from the camera 70 as well as the microphone 85. The microphone 85 is further controlled by the enabling (ON) or disabling (OFF) action of the microphone switch 33. The output of the display 40 utilizes a display driver circuit 100. Another output of the microprocessor 80 is directed to an audio amplifier 105. The output level of the amplifier 105 is controlled by the volume control 22. The output of the amplifier 105 is delivered to the transmitter 23 which wirelessly communicates with a paired device when selected. Should the transmitter 23 be deactivated, audio output is then directed to the speaker 90. The selector control 30, the selector switch 31, and the operating button 32 form inputs to the microprocessor 80 to control the operating mode of the implement 10. Finally, an array of memory circuits 100, store all of the various languages, rules, syntax and the like of all languages for referencing via the microprocessor 80 during the translation process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A hand-held implement consisting of:
   an upper body section having a truncated cone shape and extending linearly outward from an upper end of a middle body section;
   a middle body section having a cylindrical shape configured to be gripped by a user, the middle body section housing a rechargeable battery and a microprocessor, and having disposed thereon a selector control, a selector switch, and an operating button, all linearly aligned with a digital display located adjacent the upper body section, wherein the selector control is configured to scroll through menu items displayed on the display and the selector switch is configured to activate selected menu items;
   a lower body section having a truncated cone shape and extending linearly outward from a lower end of the middle body section, the lower body section terminating in a lens aligned with a camera disposed therein, the camera being in electrical communication with the rechargeable battery and the microprocessor;
   a speaker disposed on the middle body section opposite the display, the speaker in electrical communication with the microprocessor and configured to emit audio signals representing translated output;
   a microphone disposed adjacent to the upper body section, between the upper body section and the display, the microphone configured to capture audio input for processing by the microprocessor; and,
   a volume control disposed on the middle body section diametrically opposite a power switch, the volume control configured to adjust output levels of the speaker; and, wherein the microprocessor is configured to process either text captured by the camera or audio captured by the microphone, and provide a translated output via the display or the speaker as determined by the menu item selected using the selector control and selector switch;
   wherein the operating button is positioned adjacent the selector control and is configured to be depressed by a user to activate the processing of text during movement of the lens over source text; and,
   wherein the microprocessor is further configured to store and retrieve multiple language translation rules and to selectively output translated content in a second language based on menu selections identifying a first language and the second language.

* * * * *